(12) United States Patent
Henkel et al.

(10) Patent No.: US 6,296,271 B1
(45) Date of Patent: Oct. 2, 2001

(54) INSTRUMENT PANEL FOR A MOTOR VEHICLE

(75) Inventors: Joerg Henkel, Goeppingen; Manfred Mueller, Deizisau; Harald Rudolf, Tuebingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/339,243

(22) Filed: Jun. 24, 1999

(30) Foreign Application Priority Data

Jun. 24, 1998 (DE) .............................................. 198 28 001

(51) Int. Cl.[7] .................................................. B60R 21/20
(52) U.S. Cl. .................................. 280/728.3; 280/728.2; 280/732
(58) Field of Search .............................. 280/728.3, 732, 280/728.2, 752

(56) References Cited

U.S. PATENT DOCUMENTS

| | | | |
|---|---|---|---|
| 3,622,176 | * 11/1971 | Byer | 280/732 |
| 4,895,389 | * 1/1990 | Pack, Jr. | 280/732 |
| 5,203,586 | * 4/1993 | Niwa et al. | 280/728.3 |
| 5,390,950 | * 2/1995 | Barnes et al. | 280/728.3 |
| 5,456,487 | * 10/1995 | Daris et al. | 280/728.3 |
| 5,456,490 | * 10/1995 | Carter et al. | 280/728.3 |
| 5,501,890 | * 3/1996 | Mills | 428/68 |
| 5,738,367 | * 4/1998 | Zichichi et al. | 280/728.3 |
| 5,762,362 | * 6/1998 | Kikuchi et al. | 280/728.3 |
| 5,931,534 | * 6/1999 | Klingauf | 280/728.3 |
| 5,957,483 | * 9/1999 | Miltenberger et al. | 280/728.3 |
| 5,961,142 | * 10/1999 | Shiraki et al. | 280/728.3 |
| 5,961,143 | * 10/1999 | Hlywka et al. | 280/728.3 |
| 5,975,563 | * 11/1999 | Gallagher et al. | 280/728.3 |
| 5,979,931 | * 11/1999 | Totani et al. | 280/728.3 |
| 6,065,771 | * 5/2000 | Kawakubo et al. | 280/728.3 |
| 6,082,759 | * 7/2000 | Faigle et al. | 280/728.3 |

FOREIGN PATENT DOCUMENTS 43 11 241 C1    4/1994 (DE) .

* cited by examiner

Primary Examiner—Brian L. Johnson
Assistant Examiner—Deanna Draper
(74) Attorney, Agent, or Firm—Crowell & Moring LLP

(57) ABSTRACT

An instrument panel for a motor vehicle. The panel is adapted to cover the front passenger air bags with webs in one piece with a support preform of the instrument panel, in which case the webs are situated outside a passage contour of the front passenger air bag. The wall thickness of the support preform is reduced at least in sections in the area of the webs.

5 Claims, 2 Drawing Sheets

INSTRUMENT PANEL FOR A MOTOR VEHICLE

This application claims the priority of 198 28 001.7-21, filed Jun. 24, 1998, the disclosures of which is expressly incorporated by reference herein.

BACKGROUND AND SUMMARY OF THE INVENTION

The present invention relates to an instrument panel for a motor vehicle, for example, a passenger car. The instrument panel has a shell-type support preform and a covering which is integrated in the support preform. The covering is adapted to close a passage opening for a front passenger air bag. In the event of a sudden expansion of the front passenger air bag, the cover detaches, at least partially, from the support preform. The covering is connected with the support preform by means of several webs distributed along the circumference of the covering. The webs are positioned outside the contour of the passage opening.

A previously known type of instrument panel is disclosed in German Patent Document DE 43 11 241 C1. This instrument panel has a shell-shaped support preform which is made of a fiber-reinforced plastic material. The preform extends along the whole width of the vehicle interior and on a front passenger side, a covering is integrated for a passage opening of a front passenger air bag. The covering is integrally connected by way of webs with the support preform. The webs are situated outside the contour of a passage opening for expansion of the front passenger air bag. In this case, corresponding recesses are provided on an edge of the support preform which flanks the passage opening, into which recesses the webs project and on whose base the webs change into the support preform. The webs each have the same width along their whole length. In the event of a sudden expansion of the front passenger air bag, the covering is pressed to the outside, whereby the webs break off. However, it is also possible that, during such an expansion of the front passenger air bag, the webs may break off on the covering. In this case web particles or pieces remaining on the edge of the support preform may damage the expanding front passenger air bag.

It is an object of the invention to provide an instrument panel of the above-mentioned type which reliably prevents damage to the front passenger air bag in the event of a sudden unfolding.

This and other objects are achieved in the present invention by reducing the wall thickness of the support preform at least in sections in the area of the webs. The present invention provides a covering in one piece together with the shell-type support preform. As the result of reducing the wall thickness, at least in sections in the area of the webs, the material is weakened. When the air bag is expanded and the covering is pressed open, the webs necessarily and reliably break in these areas of reduced wall thickness. Since the webs, and therefore also the areas with reduced wall thickness, are situated outside the contour of the passage opening for the front passenger air bag, damage to the front passenger air bag by remaining pieces of the broken webs is avoided. The areas with the reduced wall thickness therefore form defined desired breaking points. Since the covering is integrated in the support preform and is therefore produced in one piece with the support preform, the covering always has the same wall thickness as the support preform.

According to another aspect of the invention the reduction of the wall thickness is formed by a linear transition area. As a result, weakening of the material is ensured and thus the desired breaking point is formed in a defined manner in the area of the reduced wall thickness.

According to a further aspect of the invention, the wall thickness of the support preform is reduced in a surrounding ring area, which encloses the covering and accommodates the webs. As the result of the thinner design of the surrounding ring area, the area with the reduced wall thickness can be produced with particular ease, this area being produced together with the manufacturing of the support preform and the covering in one operation. The support preform, including the covering, may be produced of a fiber-reinforced plastic material, preferably of PVC/ABS.

According to a further aspect of the invention, the webs may be formed by connection areas which taper from the covering toward the edge of the support preform. This design further improves the creation of defined desired breaking points outside the contour of the passage opening. The desired breaking point is situated in the narrowest section of each web and therefore in each case at a point away from the covering. Even considered by itself, this solution achieves the above-mentioned object.

Other objects, advantages and novel features of the present invention will become apparent from the following detailed description of the invention when considered in conjunction with the accompanying drawings.

BRIEF DESCRIPTION OF THE DRAWINGS

Additional advantages and characteristics of the invention are found in the subclaims. In the following, a preferred embodiment of the invention is described and illustrated by means of the drawings.

DETAILED DESCRIPTION OF THE DRAWINGS

Figure 1:
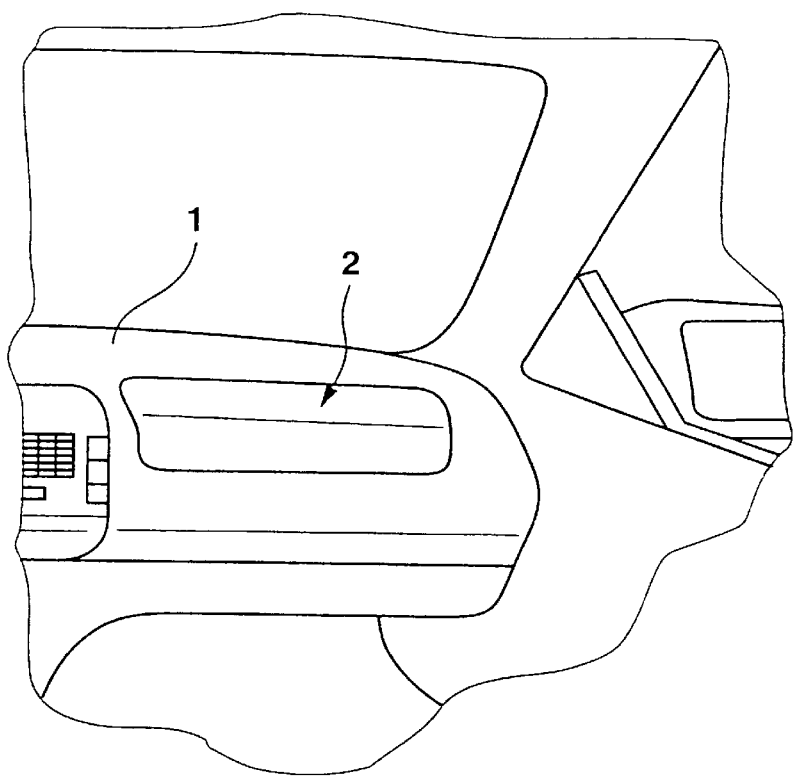
FIG. 1 is a perspective view of an embodiment of an instrument panel according to the invention in the area of a front passenger side.

According to FIG. 1, an instrument panel 10 for a passenger car is arranged below a windshield in a vehicle interior and extends along the entire width of the vehicle interior. The instrument panel 10 has a dimensionally stable and shell-shaped support preform 1 in which a two-part covering 2 is integrated on the front passenger side. The covering 2 is used for covering a passage opening for the unfolding of a front passenger air bag which is arranged below the support preform 1 on the front passenger side. The covering 2 is produced in one piece with the support preform 1 and has the same wall thickness as the support preform 1.

Figure 2:
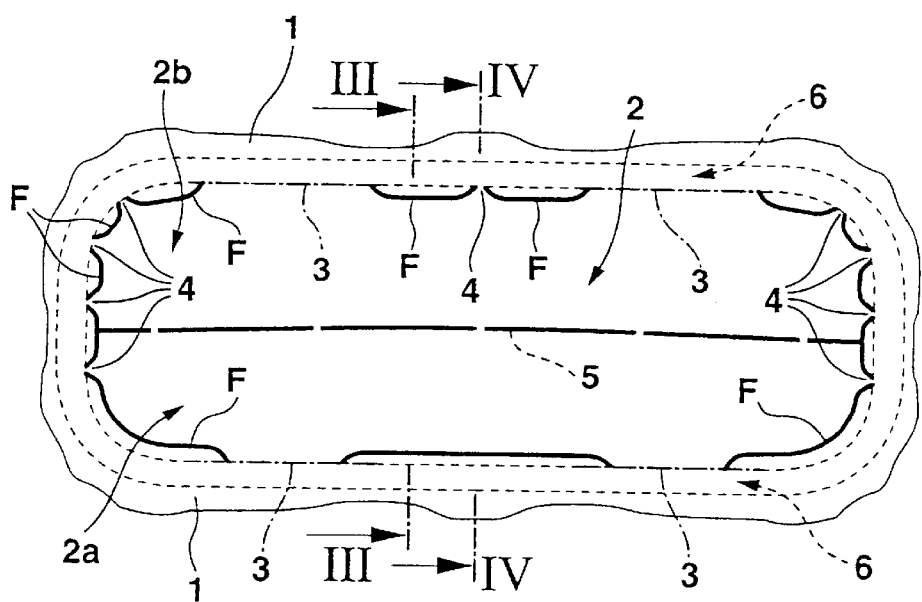
FIG. 2 is an enlarged schematic view of the instrument panel according to FIG. 1 in the area of a covering which closes a passage opening for a front passenger air bag.
Figure 3:
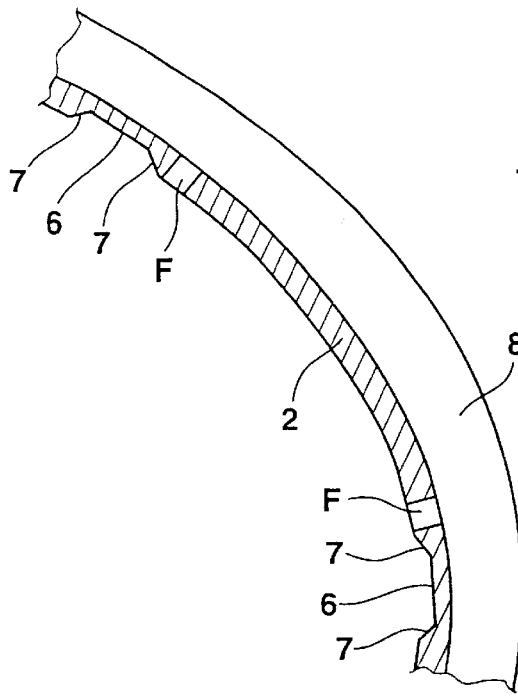
FIG. 3 is a sectional view of the instrument panel along the intersection Line III—III in FIG. 2.
Figure 4:
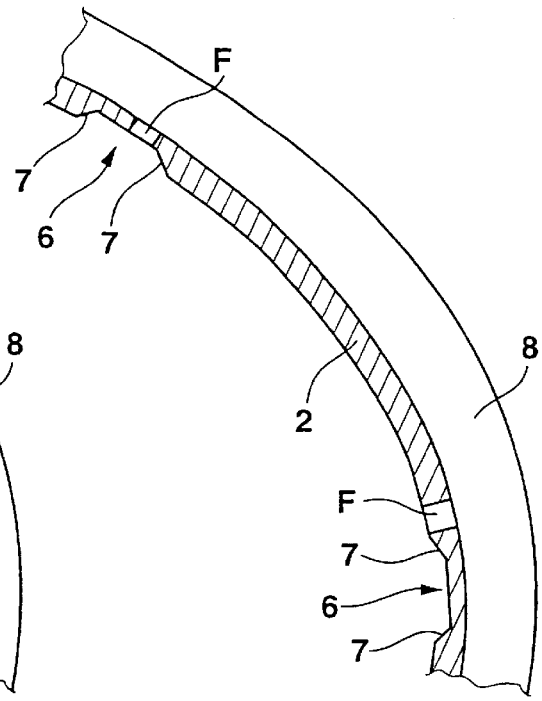
FIG. 4 is another sectional view of the instrument panel according to FIG. 2 along the intersection Line IV—IV in FIG. 2.

The support preform 1 as well as the covering 2 are covered on their surface by a foam cushioning 8, as illustrated in FIGS. 3 and 4. However, when the front passenger air bag is expanded and the covering 2 is pressed open, this foam cushioning forms no significant resistance. As illustrated in FIG. 2, covering 2 comprises two flaps 2a, 2b which are each connected by way of wide, stationary hinge webs 3 with an edge of the support preform 1 surrounding the passage opening. In the area of the hinge webs 3, additional sheet metal strips may be inserted which ensure a swivelling-open of the two flap parts 2a, 2b about the hinge axes defined by the upper and lower hinge webs 3. The two flap parts 2a, 2b are connected with one another by an approximately horizontally extending desired breaking line 5.

In addition to being connected by the stationary hinge webs 3, the covering 2 is connected in its remaining circumferential area by several outwardly projecting webs 4 in one piece with the edge of the support preform 1. Between these webs 4 and the hinge webs 3, the covering 2 is separated from the support preform 1 by a corresponding milling cut F.

The support preform 1 and thus the covering 2 are produced of a plastic material which is relatively brittle and breaks in a sharp-edged manner. Preferably PVC/ABS or a differently designed fiber-reinforced plastic material is provided for this purpose. The milling cut F, which represents a cut area separating in an almost surrounding manner the support preform 1 from the covering 2. Milling cut F defines the contour of the passage opening for the front passenger air bag and the edge of the covering 2. The milling cut F ends, on the one hand, in the area of the hinge webs 3 and, on the other hand, in the area of the webs 4 so that, in these areas, the covering 2 remains connected with the support preform 1, that is, its edge.

Figure 5:
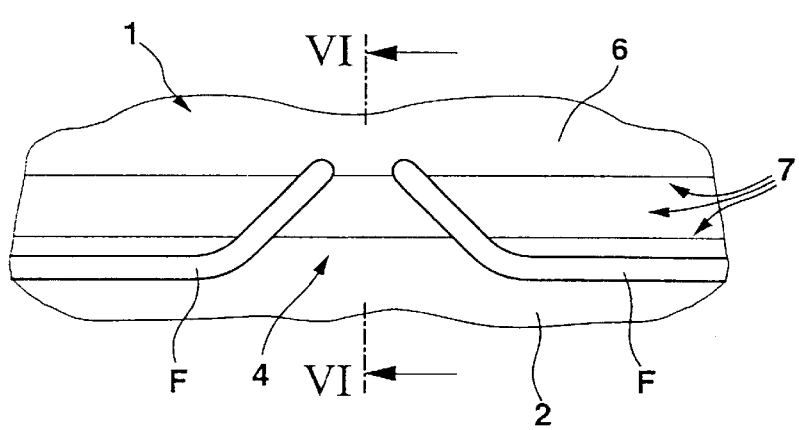
FIG. 5 is an enlarged representation of a cutout in an edge area of the passage opening at the level of a web connecting the covering with the edge.

As illustrated in FIG. 5, the separating cuts of the milling cut F are directed diagonally to the outside at the level of the webs 4 and extend toward one another, thereby forming webs 4. Between the covering 2 and the support preform 1, a trapezoidal connection area is formed which represents the respective web 4. The desired breaking point is defined by the narrowest point of the web 4 at the level of the opposite ends of the separating cuts of the milling cut F. The width of each trapezoidal-support web 4 at the level of the desired breaking point, is less than half as wide as the connection area at the base of the web 4 and thus at the level of the contour of the passage opening defined by the milling cut F. The base of each web is therefore simultaneously situated at the level of the edge of the covering 2.

Figure 6:
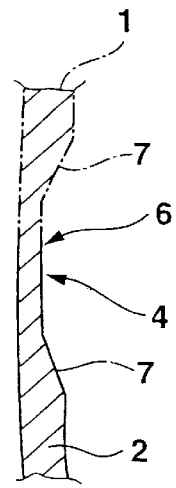
FIG. 6 is a cross-sectional view of the web according to FIG. 5 along the intersection Line VI—VI in FIG. 5.

In addition, an edge area 6 of the support preform 1, which is designed as a ring area surrounding the covering 2. Edge area 6 is provided with a reduced wall thickness with respect to the other areas of the support preform 1 and of the covering 2. As illustrated in FIGS. 3, 4 and 6, the wall thickness is tapered to approximately half the thickness of the remaining wall thickness of covering 2 and support preform 1. The tapering takes place at linear transition areas 7 from the direction of the covering 2 as well as from the direction of the support preform. Thus, the desired breaking point of each web 4 is situated in the edge area 6 with a reduced wall thickness, the web 4 being situated in each case at the level of the transition area 7. The reduced wall thickness provides, in addition to the tapering of the width of each web 4, an additional weakening of the plastic material in the area of each desired breaking point of each web 4. As such, in the event of a sudden expansion of the front passenger air bag, the covering 2, by way of flap parts 2a, 2b, will break reliably in the area of the desired breaking points of the webs 4.

Since the desired breaking points are situated in the area of the tips of the webs 4, the webs 4, together with the covering 2, that is, the flap parts 2a, 2b, in the event of a sudden expansion of the front passenger air bag, are swivelled to the outside, whereby they do not impair the free expansion of the front passenger air bag. At the level of the webs 4, trapezoidal recesses remain in the area of the passage opening, and only each base of each recess has a sharp-edged breaking point. However, this breaking point is situated outside the contour of the passage opening and thus does not stand in the way of the passage of the front passenger air bag. The respective forward edges of each recess at the level of the contour of the passage opening are rounded by means of the milling cut F, as illustrated by means of FIG. 5. An unintentional breaking of the webs 4 in an area facing more toward the covering 2 is reliably prevented by the wide design of the webs 4 at their base as well as the larger wall thickness in comparison to the tip of each web 4, so that in each case the desired breaking points will occur outside the contour of the passage opening.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An instrument panel for a motor vehicle comprising a shell-type support preform and a cover which is integrated in the support preform, the cover being adapted to close a passage opening for a front passenger air bag and which, in the event of a sudden expansion of the front passenger air bag, detaches at least partially from the support preform, the cover being connected with the support preform by several webs distributed along a circumference of the cover, the webs being positioned outside the contour of the passage opening, wherein the support preform has a reduced wall thickness at least in sections in an area of the webs and wherein the webs are formed by connection areas that taper from the cover toward an edge of the support preform.

2. An instrument panel according to claim 1, wherein the reduced wall thickness is formed by a linear transition area.

3. An instrument panel according to claim 1, wherein the reduced wall thickness of the support preform is provided in a surrounding edge area that encloses the cover and receives the webs, with respect to the wall thickness of the covering and of the support preform.

4. An instrument panel according to claim 1, wherein the tapering connection area extends in a trapezoidal shape.

5. An instrument panel according to claim 1, wherein a base of each connection area is at least twice as wide as a tip of the connection area facing the support preform.

* * * * *